No. 897,311. PATENTED SEPT. 1, 1908.
G. SPENCER.
PRESSURE RECORDER.
APPLICATION FILED MAR. 13, 1908.
2 SHEETS—SHEET 1.
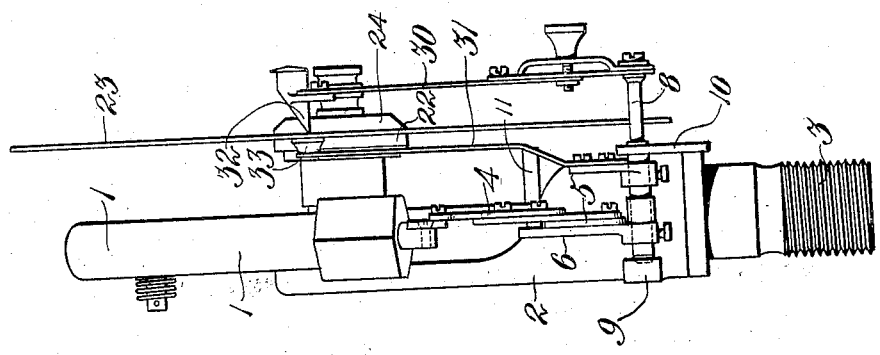
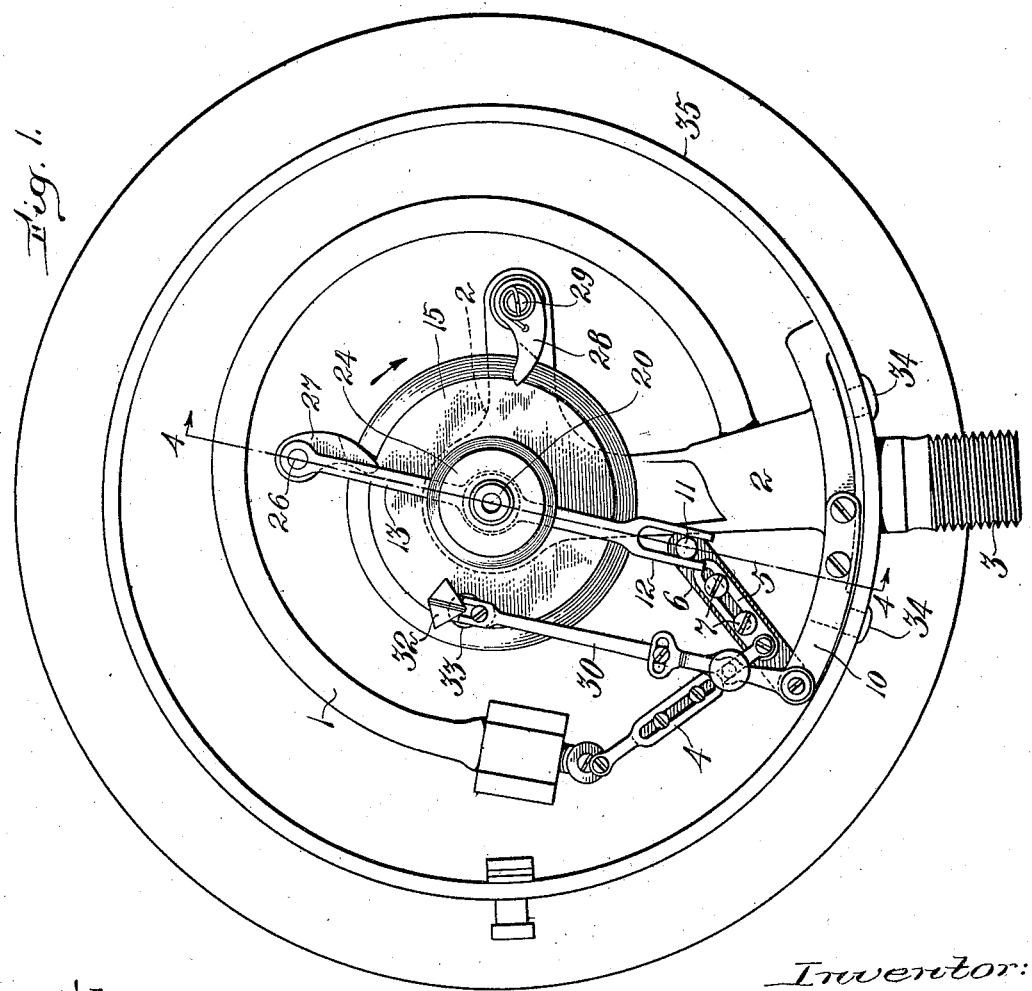
Witnesses:
Jesse A. Holton
H. C. Bowser.
Inventor:
George Spencer,
by Ralph W. Foster
Atty.

No. 897,311. PATENTED SEPT. 1, 1908.
G. SPENCER.
PRESSURE RECORDER.
APPLICATION FILED MAR. 13, 1908.
2 SHEETS—SHEET 2.
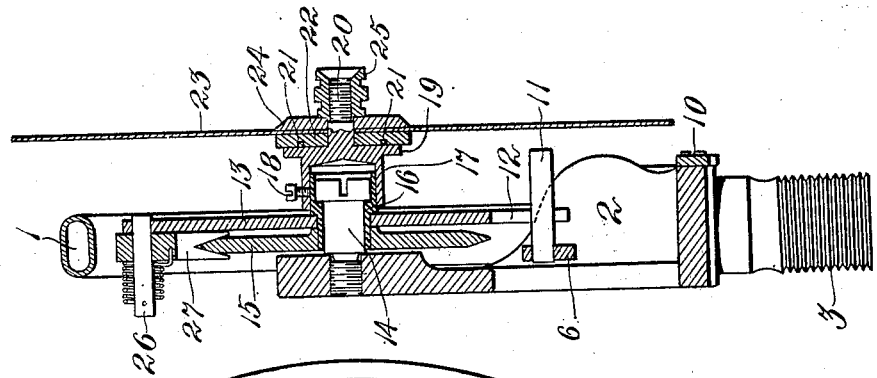
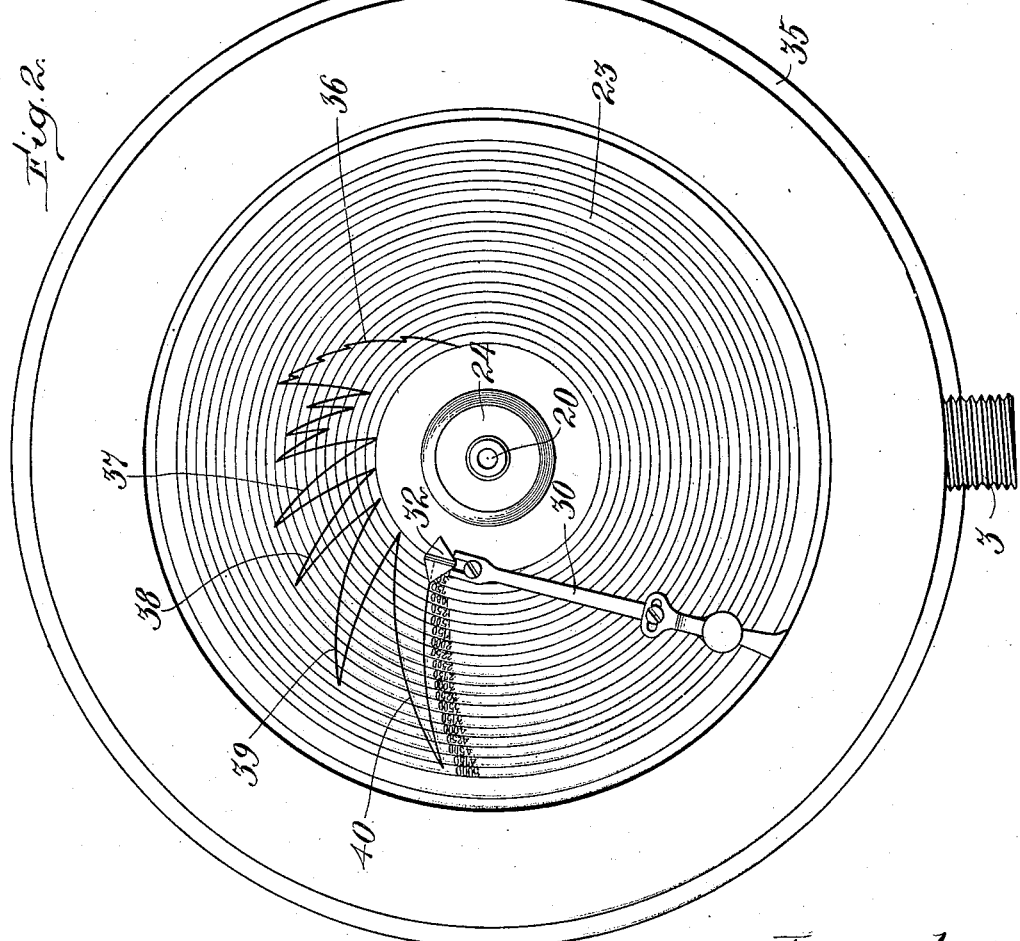
Witnesses:
Jesse A. Holton
H. C. Bowser.
Inventor:
George Spencer,
by Ralph W. Foster
Atty.

UNITED STATES PATENT OFFICE.

GEORGE SPENCER, OF MEDFORD, MASSACHUSETTS, ASSIGNOR TO CROSBY STEAM GAGE AND VALVE COMPANY, OF BOSTON, MASSACHUSETTS, A CORPORATION OF MASSACHUSETTS.

PRESSURE-RECORDER.

No. 897,311.  Specification of Letters Patent.  Patented Sept. 1, 1908.

Application filed March 13, 1908. Serial No. 420,795.

*To all whom it may concern:*

Be it known that I, GEORGE SPENCER, a citizen of the United States, and resident of Medford, in the county of Middlesex and State of Massachusetts, have invented certain new and useful Improvements in Pressure-Recorders, of which the following is a specification.

My invention relates to that class of pressure recording gages in which a Bourdon tube spring makes the record by moving a pen over a chart.

Its object is to provide for automatically rotating the chart synchronously with the pen in order to secure a diagram indicating the amount of pressure at each step or instant of an operation, for example, the operation of pressing a car wheel upon its axle.

In the recorders heretofore employed the chart remains stationary while the pen moves over it to indicate the maximum pressure employed in an operation like that described; heretofore provision has also been made for rotating the chart a certain distance after each operation in order to present a new section thereof to receive the record of the succeeding operation. But heretofore no provision has been made for indicating the amount of pressure at each step or instant of an operation.

The invention is illustrated by the accompanying drawings in which—

Figure 1 is a front elevation of the gage with the chart and glass cover removed. Fig. 2 is a front elevation with the glass cover and chart in place. Fig. 3 is a side elevation looking from the left of Fig. 1 without the case but showing the chart. Fig. 4 is a section on line 4—4 Fig. 1.

Similar characters refer to similar parts throughout the several drawings.

The tube spring 1 is fixed at its inner end to the gage socket 2 which is furnished with the threaded projection 3 for attachment to a pressure supply pipe. To the outer end of the tube spring is pivoted the longitudinally adjustable link 4 which in turn is pivoted to the slotted piece 5 mounted longitudinally adjustably on the link 6 and held in adjustment thereon by the screws 7, said link 6 having its outer end fixed to the shaft 8 journaled in the lug 9 of the socket and in the plate 10 fixed to the socket. The other end of the link 6 is furnished with a stud 11 adapted to engage the lower forked end 12 of the lever 13 which is rotatably mounted on the sleeve 16 which is furnished with an exterior, annular shoulder which engages the outer side of said lever, and an interior, annular shoulder which engages the outer end of the stud 14 upon which stud said sleeve is rotatably mounted and which is screwed into the gage socket 2. On the inner end of this sleeve 16 is soldered the beveled disk 15. The cap 19 engages the upper end of the sleeve 16, being secured thereon by the set screw 18 and being furnished with the enlarged upper end 19, threaded spindle 20 and the studs 21, which cap is engaged by the collar 22 preferably made of rubber. Upon this collar 22 is placed the annular chart 23 furnished with a series of concentric circles marked to indicate pressures from 250 to 5000 pounds, and over the stud and chart is placed another rubber collar 24, all of which are secured in place by the thumb nut 25. The upper end of the lever 13 is furnished with a stud 26 on which is mounted the spring-pressed friction driving pawl, or clutch, 27 which engages the disk 15; and the gage socket 2 is furnished with a stud 29 on which is mounted a similar spring-pressed friction retaining pawl, or clutch, 28, which also engages said disk. On the shaft 8 are mounted the pen arm 30 and pen-platform arm 31 carrying, respectively, the pen 32 and pen-platform 33 between which the chart rotates. The gage socket is fastened by screws 34 to the case 35.

The operation is as follows: The pressure fluid being admitted into the tube spring expands it thereby moving its free end outwardly and, through the link and lever mechanism described, moving the pen and pen-platform across the chart and at the same time rotating the disk and chart in the direction indicated by the arrow in Fig. 1, the clutch 27 carrying the disk around with it and the disk sliding past the clutch 28. When the pressure ceases, the outer end of the spring, the pen, pen-platform and lever 13 return to their normal position, while the clutch 28 holds the disk *in statu quo*, the clutch 27 sliding past the disk. By this double movement of the pen over the rotating chart a series of curves is made, as shown in Fig. 2, each of which indicates the maximum pressure in a distinct operation and also the degree of pressure at each step or instant. The curve marked 36 indicates a variation of pressure at intervals during a single operation, while the curves marked 37, 38, 39, 40 indicate a constantly increasing pressure in each case.

Having described my invention what I claim and desire to secure by Letters Patent is:

1. A pressure recording gage comprising in combination a Bourdon tube spring, a chart and a rotary chart support, with means comprising a friction driving pawl, actuated by said Bourdon tube spring whenever and while expanding under pressure, for rotating said chart support in one direction, means simultaneously actuated by said Bourdon tube spring for recording such pressure upon said chart and means comprising a friction retaining pawl for preventing the rotation of said chart support in the opposite direction; substantially as described.

2. A pressure recording gage comprising in combination a Bourdon tube spring, a chart and a rotary chart support, with means, actuated by said Bourdon tube spring whenever and while expanding under pressure, for rotating said chart support in one direction, means simultaneously actuated by said Bourdon tube spring for recording such pressure upon said chart and means for preventing rotation of said chart support in the opposite direction; substantially as described.

3. In a pressure recording gage the combination, with a Bourdon tube spring, pen, chart and rotary chart support, of means, actuated by said Bourdon tube spring whenever and while expanding under pressure, for simultaneously rotating said chart support and moving said pen over said chart; substantially as described.

In testimony whereof I have affixed my signature, in presence of two witnesses.

GEORGE SPENCER.

Witnesses:
RALPH W. FOSTER,
HELEN M. DEARBORN.